United States Patent [19]

Radl

[11] 4,284,994
[45] Aug. 18, 1981

[54] LASER BEAM RECORDER

[75] Inventor: Bruce M. Radl, Billerica, Mass.

[73] Assignee: Eikonix Corporation, Bedford, Mass.

[21] Appl. No.: 61,808

[22] Filed: Jul. 30, 1979

[51] Int. Cl.³ ............... G01D 15/14; G02B 27/17
[52] U.S. Cl. .................... 346/108; 350/6.8; 358/293
[58] Field of Search ............. 346/108; 358/293, 296; 350/6.8, 6.7

[56] References Cited

U.S. PATENT DOCUMENTS

| 3,773,404 | 11/1973 | Moore | 350/175 TS |
| 3,848,087 | 11/1974 | Carrell | 350/6.8 X |
| 3,961,838 | 6/1976 | Zanoni | 350/6.8 |
| 4,054,360 | 10/1977 | Oosaka | 350/6.8 |
| 4,054,361 | 10/1977 | Noguchi | 350/6.8 |

Primary Examiner—Joseph W. Hartary
Attorney, Agent, or Firm—Charles Hieken

[57] ABSTRACT

A compact and simple laser beam recorder is arranged to minimize line scan displacement error typical of such recorders using a rotating polygonal mirror scanner.

10 Claims, 3 Drawing Figures

LASER BEAM RECORDER

BACKGROUND OF THE INVENTION

The present invention relates to laser beam recorders using a polygonal mirror as a scanning device, and more particularly concerns a novel laser beam recorder arranged to compensate for a tilted facet of the polygonal mirror.

Laser beam recorders have included a laser and optical and mechanical systems arranged to provide a two dimensional photographic image on a photographic film in response to an electrical signal representative of the image. Usually an acousto-optical or electro-optical modulator is used to control or modulate incident flux of the laser beam. The modulated laser beam is then raster scanned across the photosensitive film by the optical and mechanical systems to produce the photographic image. A polygonal mirror is often used to scan one dimension of the desired image. However, expensive precision polygonal mirrors are required to maximize the coincidence of the scan lines produced by each facet of the polygonal mirror since a scan line displacement error is caused if a mirror facet is tilted. The degree of precision required for the mirror facets can be significantly relaxed through the use of corrective optics as disclosed in the IBM Journal of Research and Development, Vol. 21, No. 5, page 481. However, a compact laser beam recorder using fewer and simpler elements than previous designs is needed to compensate for scan line displacement errors caused by polygonal scan mirrors having tilted facets.

Accordingly, it is an important object of this invention to provide a simple, compact laser beam recorder including a polygonal mirror scanner in an optical system adapted to minimize scan line displacement errors associated with rotating polygonal mirror scanners.

SUMMARY OF THE INVENTION

According to the invention, a recording apparatus includes photosensitive material, and a laser for producing a beam of coherent light. Modulator means is connected to the laser for modulating the laser beam in response to an electrical signal representative of an image. Filter means spatially filters the modulated laser beam. The filter means has a pin hole for providing an axial object point. A rotatable polygonal mirror, a cylindrical lens for imaging the object point as a line on the polygonal mirror and a scan lens are included in an optical path. Beam splitting means direct the filtered and modulated laser beam from the object point along the optical path through the cylindrical lens and scan lens for reflection by the mirror. The reflected beam is directed in reverse along the same optical path through the scan lens, cylindrical lens, and beam splitter to the photosensitive material for recording as an image point. Numerous other features, objects and advantages of the invention will become apparent from the following specification when read in connection with the accompanying drawing in which:

DETAILED DESCRIPTION OF PREFERRED EMBODIMENTS

Figure 1:
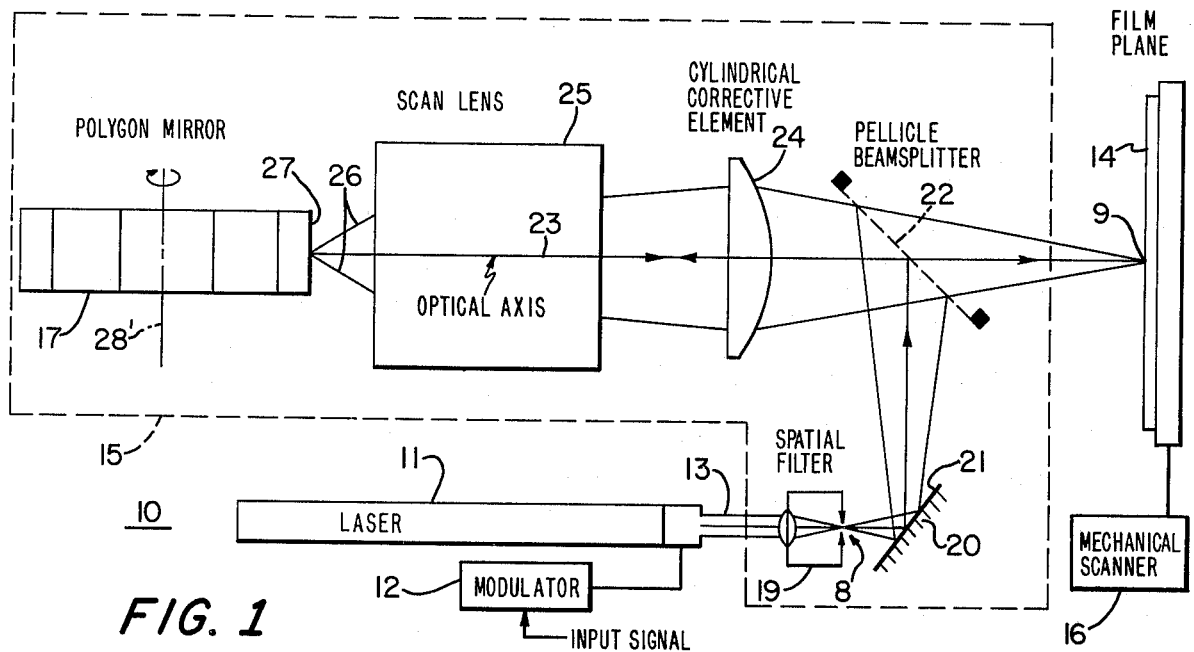
FIG. 1 is a schematic representation of a side view of laser beam recorder arranged according to the invention.
Figure 2:
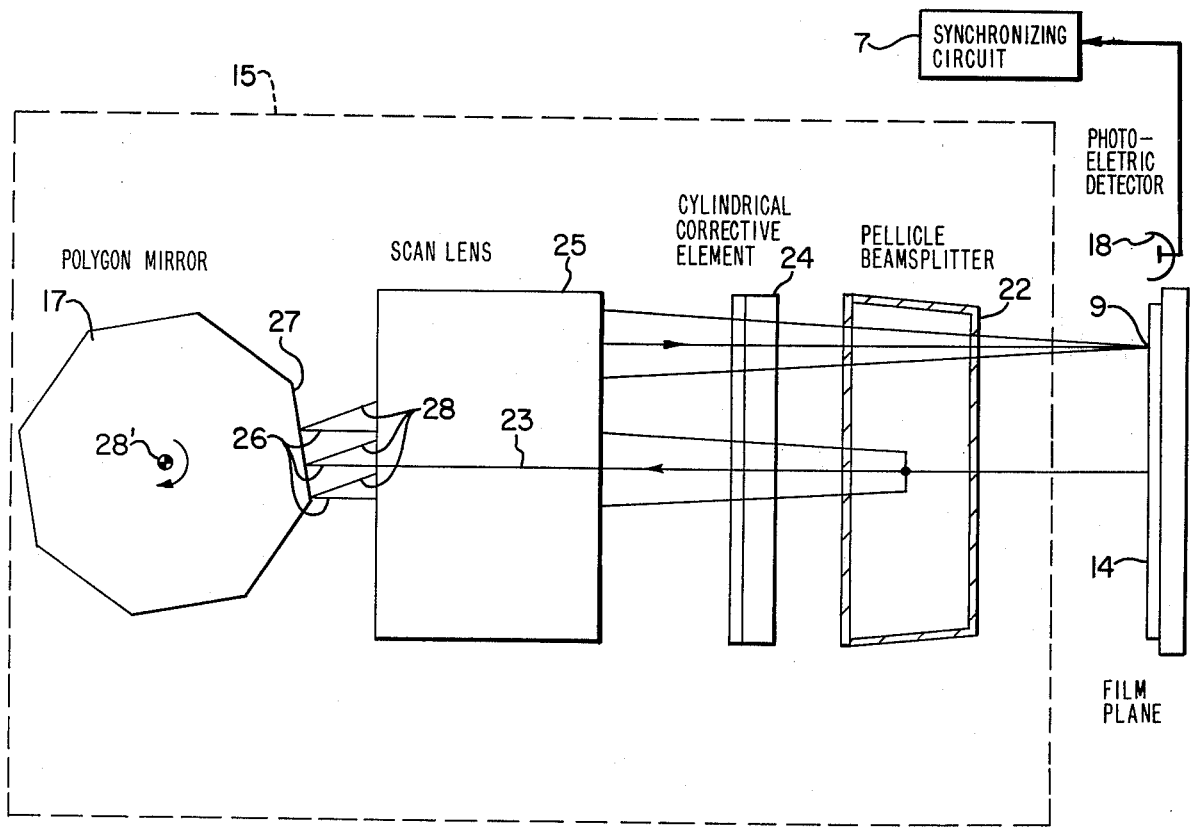
FIG. 2 is a schematic representation of a top view of FIG. 1.

Referring to FIGS. 1 and 2, there is shown schematic diagrams of side and top views of a laser beam recorder 10 arranged according to the invention to provide a two-dimensional photographic image from an electrical representation of the image. The laser beam recorder 10 includes a laser system 11 adapted to provide a coherent beam of light. A modulator 12 is connected to the laser system 11 so as to control the beam 13 provided by the laser system 11 in response to electrical input signals representative of the desired image. The modulated laser beam 13 is then raster scanned across a photosensitive file 14 by optical 15 and mechanical systems 16 so as to record a two dimensional image on the film 14. The optical system 15 has a rotatable polygonal mirror 17 for scanning one dimension of the image on the film 14 while the mechanical system 16 includes a mechanical scanner for stage stepping the film 14 for the other dimension of the image. A photoelectric detector 18 is used to sense the location of a spot or image point 9 in the image or film plane and supply an electrical control signal to a synchronizing electronic circuit 7, such as a microprocessor, before the spot 9 reaches the edge of film 14. The use of the photoelectric detector 18 to determine the exact location of the spot 9 elminates the need of a polygonal scan mirror 17 with highly precise interior angles.

Under operating conditions, the modulated laser beam 13 is spatially filtered by a filter 19 having a pinhole arranged to provide an axial object point 8. A plane mirror 20 has a reflecting surface 21 angularly located relative to the axis of the filtered beam so as to reflect the modulated and filtered laser beam toward a pellicle beam splitter 22 adapted to direct part of the filtered beam along an optical axis 23 through a cylindrical lens 24 and scan lens 25. The axial object point provided by the pinhole is imaged by the cylindrical lens 24 through the scan lens 25 as a line on the polygonal mirror 17. The scan lens 25 transmits light from the object point 8 to its front focal point at the polygonal mirror 17. The scan lens 25 may include a suitable combination of spherical or cylindrical elements. A cylindrical scan lens 25 would be oriented with its power in the principal meridian perpendicular to that of the cylindrical lens 24. In the preferred embodiment, a 152 millimeter spherical scan lens is used. The rays 26 incident on the polygonal mirror facet 27, as seen in FIG. 2, are collimated since the object point 8 is at the rear focal point of the scan lens 25 and the cylindrical lens 24 has no power in the scanning plane. After being reflected by a mirror facet 27, the returning rays 28 follow a reverse path through the scan lens 25, cylindrical lens 24 and beam splitter 22. Approximately 50 percent of the optical energy in the returning beam is transmitted through the beam splitter 22 to an image point 9 on the film 14. The object point 8 at the spatial filter 19 and image point 9 on the film 14 form an axial conjugate pair with a vertical image position that remains unchanged even if a facet on the polygonal mirror 17 is tilted about the optical axis 24. The cylindrical lens 24 provides an equal amount of correction for all field angles without field curvature since the scan lens 25 is adapted to produce an approximate telecentric scanning beam. The size of the image 9 point is determined by the optical system 15 and the pinhole diameter and is selected to be approximately 40 micrometers to cause some spot blending. Thus, it will be appreciated that the one dimension is produced by operating a motor, not shown, to rotate the polygonal scan mirror 17 about its axis 28' to reflect a scan beam with constant angular velocity. The scan lens 25 acts in response to the scan beam to provide an image point 9 that moves across the film 14 with a constant velocity. The image point velocity is the product of the angular velocity of the scanning beam and the focal length. In the preferred embodiment, the image point velocity is 970 millimeters per second and the pixel spacing is 25 micrometers. Accordingly, a mechanical scanner 16 available from Design Components, Inc., 106 Adams, Medfield, Mass. 02052, is arranged to move the film in 25 micrometer steps. The mechanical scanner 16 stage steps the film past the vertically fixed object point 9 to provide the other dimension of the two dimension image.

The photoelectric detector 18 senses the lateral position of the image point 9 on the film 14 and provides an electrical signal to the microprocessor 7, arranged to delay the beginning of data recording until all lines begin at the same distance from an edge of the film 14 as known in the art.

An example of the laser beam recorder 10 includes a laser and modulator arranged to provide a pulse width modulated signal for each pixel from 0.1 to 25.6 microseconds in duration in discrete steps of 0.1 microseconds. This arrangement enabled a display of 256 levels of an 8-bit signal. A suitable modulator 12 such as model CR-135 laser modulator system with a pixel rate of 40,000 per second is available from Coherent Inc. of Palo Alto, Calif. In another embodiment, the laser beam 13 is amplitude modulated to allow the use of an analog control means at the final electrical stage to adjust the contrast of the recorded image. A maximum image of 2048 by 2048 pixels can be recorded by the described laser beam recorder 10. The dimensions of the image is limited only by the angular field of the optical system 15 and the range of motion of the mechanical system 16.

Figure 3:
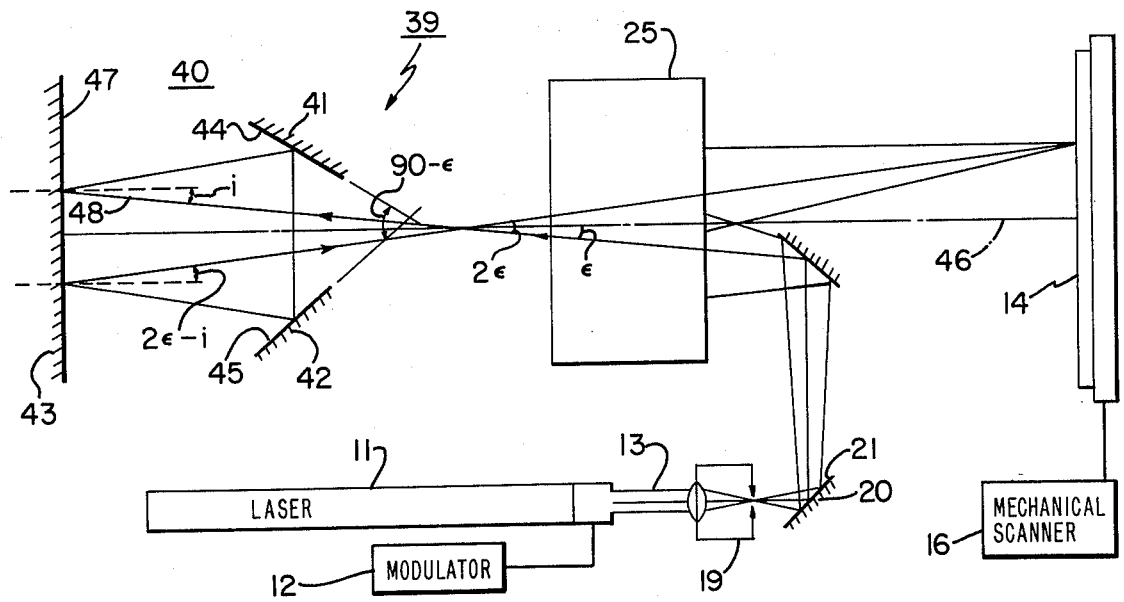
FIG. 3 is a schematic representation of a side view of another embodiment of a laser beam recorder.

Referring to FIG. 3, there is shown a schematic representation of a side view of another embodiment of the laser beam recorder 10. For convenience, reference numerals in FIGS. 1 and 2 are used to refer to like elements in FIG. 3. The laser beam recorder 39 includes a reflective system 40 having first 41 and second 42 stationary mirrors arranged to compensate for tilted facets 47 in a polygonal scanning mirror 43. The first 41 and second 42 stationary plane mirrors have reflecting surfaces 44, 45 in planes that intersect at an angle $90° - \epsilon$, where $\epsilon$ is a predetermined deviation of the intersection angle from 90°. In the preferred embodiment $\epsilon$ is 3°. The stationary mirrors 41, 42 are arranged to operate as one dimensional retro-reflectors so that a collimated beam leaving the corrected polygonal scanner 43 always makes the same vertical angle, $\epsilon$, with an optical axis 46.

Under operating conditions, an incoming collimated beam from the scan lens 25, is directed along the path 48 so as to be incident on a polygonal mirror facet 47 at an angle, i, approximately equal to $\epsilon$. The beam reflected by the polygonal mirror facet 47 is in turn reflected by each of the stationary mirrors 41, 42. The stationary mirrors 41, 42 turn the beam 180° plus an angle of $2\epsilon$. The beam reflected by both of the stationary mirrors 41, 42 is directed toward the polygonal mirror facet 47 for reflection of a second time. The angle the second reflected beam makes with the original incident beam is $2\epsilon$ and is independent of the angular tilt of the polygonal mirror facet 47. Thus, it will be appreciated that reflecting system 40 is particularly suitable for minimizing scan line displacement errors associated with rotating polygonal mirror scanners. The reflecting system 40 compensates for laser beam recorder inaccuracies caused by tilted polygonal facets without the use of corrective refractive optics such as the cylindrical lens 23.

It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited soley by the spirit and scope of the appended claims.

What is claimed is:

1. Recording apparatus comprising:
   photosensitive material;
   a laser for providing a beam of coherent light;
   modulator means being connected to said laser for modulating said laser beam in response to an electrical signal representative of an image;
   filter means for spatially filtering said modulated laser beam, said filter means having a pinhole for providing an axial object point;
   a rotatable polygonal mirror;
   a cylindrical lens for imaging said object point as a line on said polygonal mirror;
   a scan lens; and
   beam splitting means for directing said filtered and modulated laser beam along an optical path through said cylindrical lens and scan lens for reflection by said mirror, said reflected beam being redirected in reverse along said optical path through said scan lens, cylindrical lens and beam splitting means to the photosensitive material for recording as an image point.

2. Recording apparatus according to claim 1, further including a photoelectric detector for sensing position of said image point on said photosensitive material.

3. Recording apparatus according to claim 1, wherein said beam splitting means is a pellicle beam splitter.

4. Recording apparatus according to claim 1, wherein said scan lens is adapted to provide a substantially telecentric scanning beam.

5. Recording apparatus according to claim 1, wherein said scan lens is spherical.

6. Recording apparatus according to claim 1, wherein said photosensitive material is photographic film.

7. Recording apparatus comprising:
   photosensitive material;
   a laser for providing a beam of coherent light;
   modulator means being connected to said laser for modulating said laser beam in response to an electrical signal representative of an image;
   filter means for spatially filtering said modulated laser beam, said filter means having a pinhole for providing an axial object point;
   a rotatable polygonal mirror;
   a scan lens;
   first and second stationary plane mirrors with reflecting surfaces angularly arranged relative to an optical axis as one dimensional retro-reflectors; and beam reflecting means for directing said filtered beam along said axis through said scan lens to be incident on said polygonal mirror at an angle other than 90°, whereby said incident beam is reflected twice by said polygonal mirror and once by each of said stationary mirrors, said reflected beam being redirected in reverse along said optical axis through said scan lens to said photosensitive material for recording as an image point.

8. Recording apparatus according to claim 7, wherein said scan lens is adapted to act in response to said reflected beam to cause said image point to move across said photosensitive material with a constant velocity.

9. Recording apparatus according to claim 7, wherein said reflecting surfaces of said first and second stationary mirrors are in planes that interesect at an angle less than 90°.

10. Recording apparatus according to claim 7, further including a photoelectric detector for sensing position of said image point on said photosensitive material.

* * * * *